(12) United States Patent
Vardy et al.

(10) Patent No.: US 8,192,776 B2
(45) Date of Patent: Jun. 5, 2012

(54) CHEWABLE ANIMAL TOY

(75) Inventors: Bradley Ryan Vardy, Stanwood, WA (US); Joel Clayton Yinger, Mill Creek, WA (US); Peter Robinson Brown, Sedro Wooley, WA (US)

(73) Assignee: Summit Applied Technologies, Inc., Arlington, WA (US)

( * ) Notice: Subject to any disclaimer, the term of this patent is extended or adjusted under 35 U.S.C. 154(b) by 0 days.

(21) Appl. No.: 12/977,058

(22) Filed: Dec. 22, 2010

(65) Prior Publication Data

US 2011/0156307 A1    Jun. 30, 2011

Related U.S. Application Data

(63) Continuation of application No. 11/957,186, filed on Dec. 14, 2007, now abandoned.

(51) Int. Cl.
*A23P 1/10* (2006.01)
*B29C 70/72* (2006.01)

(52) U.S. Cl. ........... 426/512; 249/95; 264/275; 425/116

(58) Field of Classification Search .................. 425/116; 249/95; 264/275; 119/709, 710; 426/512
See application file for complete search history.

(56) References Cited

U.S. PATENT DOCUMENTS

| | | | |
|---|---|---|---|
| 2,003,958 A | 6/1935 | Salisbury | |
| 3,374,503 A * | 3/1968 | Boniger | 425/129.1 |
| 4,292,267 A * | 9/1981 | Haynes | 264/157 |
| 4,928,632 A | 5/1990 | Gordon | |
| 5,238,620 A * | 8/1993 | Wu et al. | 264/45.3 |
| 5,595,142 A | 1/1997 | Chill | |
| 5,618,518 A | 4/1997 | Stookey | |
| 5,832,877 A | 11/1998 | Markham | |
| 5,912,285 A | 6/1999 | Godsey | |
| 5,922,379 A | 7/1999 | Wang | |
| 5,947,061 A | 9/1999 | Markham et al. | |
| 6,067,941 A | 5/2000 | Axelrod | |
| 6,129,053 A | 10/2000 | Markham et al. | |
| 6,148,771 A | 11/2000 | Costello | |
| 6,178,922 B1 | 1/2001 | Denesuk et al. | |
| 6,186,096 B1 | 2/2001 | Miller | |

(Continued)

OTHER PUBLICATIONS

"Bioplastic," Wikipedia, The Free Encyclopedia, Dec. 26, 2009, <http://en.wikipedia.org/wiki/Bioplastic> [retrieved Jan. 6, 2010].

(Continued)

*Primary Examiner* — Robert B Davis
(74) *Attorney, Agent, or Firm* — Christensen O'Connor Johnson Kindness PLLC (57) ABSTRACT

A chewable animal toy having an edible core and a tearable outer shell molded around the edible core such that a portion of the edible core protrudes from the outer shell is provided. Further provided is a mold unit for making the chewable animal toy having a first mold half including a first mold cavity and a second mold half having a second mold cavity. The second mold half is engageable with the first mold half such that the first and second mold cavities cooperatively define an outer shell mold cavity. A first pocket is defined between the first and second mold halves that is adapted to receive a first protruding portion of the edible core. A first shut off defined within the first pocket is adapted to surround the first protruding portion of the edible core such that it is substantially isolated from the outer shell mold cavity.

14 Claims, 7 Drawing Sheets

U.S. PATENT DOCUMENTS

| | | |
|---|---|---|
| 6,202,598 B1 | 3/2001 | Willinger |
| 6,238,715 B1 | 5/2001 | Baikie |
| 6,240,879 B1 | 6/2001 | Denesuk et al. |
| 6,277,420 B1 | 8/2001 | Andersen et al. |
| 6,289,846 B1 | 9/2001 | Long |
| 6,379,725 B1 | 4/2002 | Wang et al. |
| 6,455,083 B1 | 9/2002 | Wang |
| 6,546,896 B1 | 4/2003 | Markham |
| 6,576,246 B1 | 6/2003 | Denesuk et al. |
| 6,584,938 B2 | 7/2003 | Sherrill |
| 6,586,027 B2 | 7/2003 | Axelrod et al. |
| 6,623,678 B2 * | 9/2003 | Anderson ............... 264/162 |
| 6,672,252 B2 | 1/2004 | Levin et al. |
| 6,904,870 B2 | 6/2005 | Russell-Maynard et al. |
| 6,916,497 B2 | 7/2005 | Axelrod et al. |
| 6,972,133 B1 | 12/2005 | Denesuk et al. |
| 6,990,927 B2 | 1/2006 | Axelrod |
| 7,032,541 B1 | 4/2006 | Tsengas |
| 7,063,868 B2 | 6/2006 | Axelrod |
| 7,082,894 B2 * | 8/2006 | Sherrill et al. .............. 119/709 |
| 7,087,260 B2 | 8/2006 | Axelrod |
| 7,108,815 B2 * | 9/2006 | Lee ........................... 264/139 |
| 7,137,358 B2 | 11/2006 | Denesuk et al. |
| RE39,563 E | 4/2007 | Markham |
| 7,234,420 B1 | 6/2007 | Tsengas |
| 7,270,085 B2 | 9/2007 | Wolfe, Jr. et al. |
| 2002/0119224 A1 | 8/2002 | Axelrod et al. |
| 2002/0172752 A1 | 11/2002 | Chizmas |
| 2002/0185085 A1 | 12/2002 | Sherrill et al. |
| 2004/0025803 A1 | 2/2004 | Sherrill et al. |
| 2004/0035371 A1 | 2/2004 | Tsengas |
| 2004/0126462 A1 | 7/2004 | Tepper et al. |
| 2004/0131732 A1 | 7/2004 | Axelrod et al. |
| 2004/0244720 A1 | 12/2004 | Jia |
| 2004/0244721 A1 | 12/2004 | Tepper et al. |
| 2005/0039696 A1 | 2/2005 | Springer |
| 2005/0064019 A1 | 3/2005 | Hill et al. |
| 2005/0139167 A1 | 6/2005 | Leo |
| 2006/0000424 A1 | 1/2006 | Axelrod |
| 2006/0067989 A1 | 3/2006 | Denesuk et al. |
| 2006/0102099 A1 | 5/2006 | Edwards |
| 2006/0110500 A1 | 5/2006 | Axelrod |
| 2006/0110501 A1 | 5/2006 | Axelrod |
| 2006/0150919 A1 | 7/2006 | Thomason |
| 2006/0225666 A1 | 10/2006 | Axelrod |
| 2006/0225667 A1 | 10/2006 | Handelsman et al. |
| 2007/0013104 A1 | 1/2007 | Axelrod |
| 2007/0022973 A1 | 2/2007 | Brown |
| 2007/0031556 A1 | 2/2007 | Axelrod et al. |
| 2007/0044729 A1 | 3/2007 | Denesuk et al. |
| 2007/0044730 A1 | 3/2007 | Axelrod et al. |
| 2007/0081951 A1 | 4/2007 | Stookey |
| 2007/0098841 A1 | 5/2007 | Keehn et al. |
| 2007/0140987 A1 | 6/2007 | Doyle et al. |
| 2007/0289552 A1 | 12/2007 | Axelrod et al. |
| 2008/0314333 A1 | 12/2008 | Hurwitz |
| 2009/0095231 A1 | 4/2009 | Axelrod et al. |
| 2009/0114167 A1 | 5/2009 | Axelrod et al. |

OTHER PUBLICATIONS

Office Action mailed Jul. 29, 2009, from related U.S. Appl. No. 11/957,186, filed Dec. 14, 2007.

Office Action mailed Jan. 29, 2010, from related U.S. Appl. No. 11/957,186, filed Dec. 14, 2007.

Office Action mailed Jul. 22, 2010, from related U.S. Appl. No. 11/957,186, filed Dec. 14, 2007.

* cited by examiner

CHEWABLE ANIMAL TOY

CROSS-REFERENCE TO RELATED APPLICATION

This application is a continuation of application Ser. No. 11/957,186, filed Dec. 14, 2007 and now abandoned, the entire disclosure of which is incorporated herein by reference thereto.

BACKGROUND

Many pet owners give their pet a toy or a treat to occupy the pet and/or to alleviate pain from teething. This is especially true for dogs. These toys or treats will often prevent the dog from becoming bored or from damaging things such as furniture, carpeting, walls, shoes, etc. However, most dog toys occupy the dog's attention for only a short period of time. Many of the toys are made from a durable material, such as vinyl or a hard nylon polymer, that do not "give or break down," causing the average dog to quickly become bored and lose interest in the toy. In addition, many veterinarians maintain that these harder and more durable toys pose an increased risk of chipped or broken teeth, as well as other mouth injuries in the animal. Consumable dog treats normally keep the dog interested because of the flavor; however, most treats are consumed by the dog within a very short period of time. The present disclosure provides an animal toy that is both durable and safe and that entertains the animal for a substantial amount of time.

SUMMARY

A chewable animal toy having an edible core and a tearable outer shell molded around the edible core such that a portion of the edible core protrudes from the outer shell is provided. Further provided is a mold unit for making the chewable animal toy having a first mold half including a first mold cavity and a second mold half having a second mold cavity. The second mold half is engageable with the first mold half such that the first and second mold cavities cooperatively define an outer shell mold cavity. A first pocket is defined between the first and second mold halves that is adapted to receive a first protruding portion of the edible core. A first shut off defined within the first pocket is adapted to surround the first protruding portion of the edible core such that it is substantially isolated from the outer shell mold cavity.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated by reference to the following detailed description, when taken in conjunction with the accompanying drawings, wherein.

DETAILED DESCRIPTION

Figure 1:
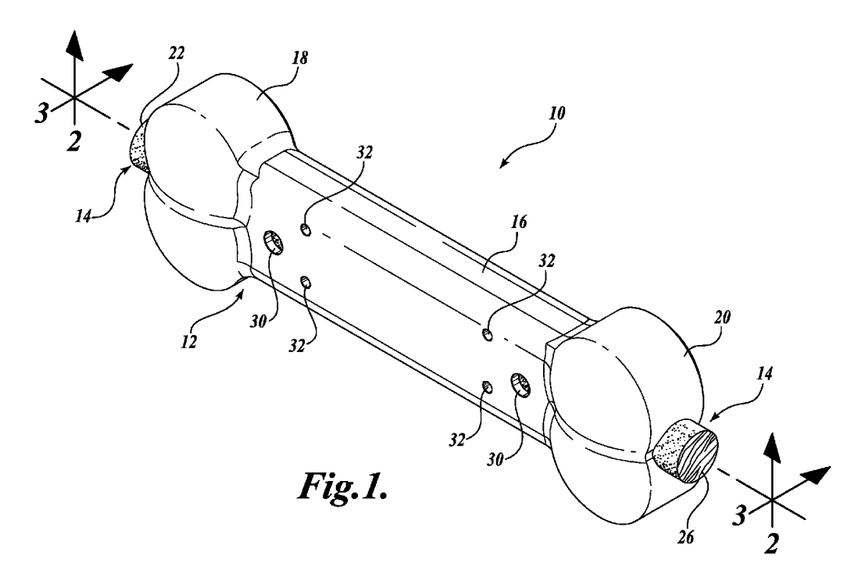
FIG. 1 is an isometric view of a representative embodiment of a chewable animal toy constructed in accordance with the present disclosure.

Referring to FIG. 1, a representative embodiment of a chewable animal toy 10 is depicted. The chewable animal toy 10 includes an outer shell 12 overmolded around a portion of an edible core 14. The outer shell 12 is preferably formed in the shape of a dog bone; however, it should be appreciated that any other suitable shape may instead be used if, for instance, the chewable toy 10 was intended to be used for an animal other than a dog or for a different breed of dogs. Thus, although the preferred embodiment of the chewable animal toy 10 will be described hereinafter for use by a dog, the chewable animal toy 10 may instead be used by any other animal or different breeds of the same animal.

Figure 2:
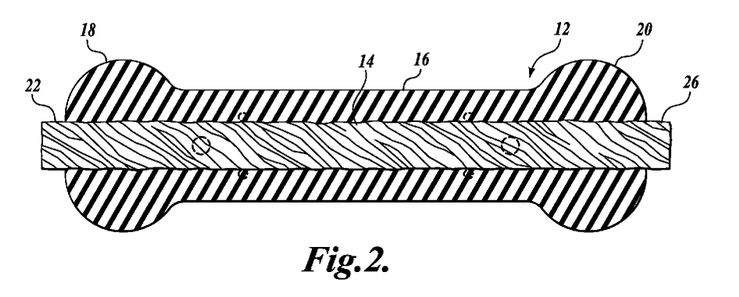
FIG. 2 is a cross-sectional view of the chewable animal toy of FIG. 1, taken substantially across lines 2-2.
Figure 3:
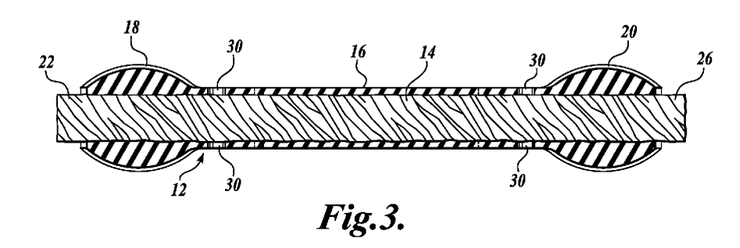
FIG. 3 is a cross-sectional view of the chewable animal toy of FIG. 1, taken substantially across lines 3-3.

Referring to FIGS. 1 and 2, the chewable animal toy 10 will now be described in detail. The outer shell 12 of the chewable animal toy 10 includes an elongated portion 16 and first and second enlarged ends 18 and 20 that together form the shape of a dog bone or another desired shape. A plurality of through-holes 30 and 32 may be formed in the elongated portion 16 or another portion of the outer shell 12 to allow the edible core 14 to be at least somewhat exposed for smelling or tasting a portion of the edible core 14. The outer shell 12 may also include a plurality of ribs, bumps, grooves, protrusions, channels, etc., formed on the exterior of the outer shell 12 that may aid in cleaning the animal's teeth when the animal chews on the outer shell 12.

The edible core 14 disposed within the outer shell 12 is any suitable shape and size such that a portion of the edible core 14 also protrudes outwardly from the outer shell 12. Preferably, the edible core 14 is elongated and substantially circular in cross-section and extends along the length of the outer shell 12. However, the edible core 14 is greater in length than the outer shell 12 such that the edible core 14 protrudes outwardly from the first and second ends 18 and 20 of the outer shell 12 to define first and second protruding ends 22 and 26 of the edible core 14. It should be appreciated that the edible core 14 may be any suitable shape and size such that a majority of the edible core 14 is enclosed within the outer shell 12, and at least a portion of the edible core 14 protrudes outwardly from the outer shell 12 or is otherwise exposed, such as by the through-holes 30 and 32. The first and second protruding ends 22 and 26 of the edible core 14 as well as the portion of the edible core 14 exposed by the through-holes 30 and 32 allow the animal to smell the edible core 14 within the outer shell 12 to motivate the animal to engage the chewable toy 10.

Although any suitable materials may be used to form the chewable animal toy 10, the outer shell 12 is made from a suitable rigid or semi-rigid material that is sufficiently durable such that animals are entertained for a substantial period of time when chewing on the toy 10. Preferably, the outer shell 12 is formed with a suitable thermoplastic material of a desired hardness and durability, depending on the type and breed of animal for which the chewable animal toy 10 is intended. The different materials could include: thermoplastic elastomers (TPE), polyolefins (polypropylene, and polyethylene), polyurethanes, and nylons. Generally, the hardness of these resins would range from 40 shore A to 90 shore A. In the preferred embodiment, the outer shell 12 is formed with TPEs or TPE urethane blends with a hardness in the range of 40-70 shore A. Preferably, the material is of a hardness such that it has a high tear threshold so that the animal may not tear through the outer shell 12 in a short amount of time, but rather, the animal must chew on the outer shell 12 for a significant amount of time in order to tear pieces of the outer shell 12 and expose the edible core 14.

The outer shell 12 is formed with an FDA approved or other non-toxic material. In this manner, the animal will not be harmed in the event that a piece of the outer shell 12 breaks off and is swallowed by the animal. The material for the outer shell 12 may be blended with other materials or additives prior to the molding of the outer shell 12, such as color concentrates, blowing agents, or health additives. Certain additives may benefit the animal while it is chewing on the outer shell 12, such as additives that kill bacteria that cause bad breath or gum disease, fluorides that strengthen teeth, or additives that control tarter buildup. Such additives can be effectively compounded with the base resin of the thermoplastic material such that it is released into the animal's mouth when the toy 10 is chewed on.

The edible core 14 may be made from any suitable, edible material that is appetizing to the animal using the chewable animal toy 10. For instance, if a dog will be using the chewable animal toy 10, the edible core 14 may be made from rawhide, compressed food, or other treat-like substances.

Referring to FIGS. 4A-4E, a preferred method of manufacturing the chewable toy 10 will now be described in detail; however, it should be appreciated that any other suitable method may instead be used. The chewable toy 10 is preferably made from a well known molding process, such as injection molding. The process includes the use of an injection molding machine, which may be any suitable injection molding machine having an injection unit and a mold unit. The injection unit (not shown) is designed to feed raw material into the mold unit in any manner well known in the art. Thus, for the sake of brevity, the injection unit will not be hereinafter described in detail.

The mold unit 34 is adapted to mold the outer shell 12 over a portion of the edible core 14. The mold unit 34 includes first and second halves 36 and 38 having first and second mold cavities 40 and 42 formed therein. The first and second mold cavities 40 and 42 cooperatively define a mold for forming the outer shell 12 when the first mold half 36 engages the second mold half 38 and are secured together, i.e., when the mold unit 34 is in the "closed" position (see FIG. 4D). The mold unit 34 is moved between open and closed positions by a suitable clamp unit (not shown) that is well known in the art.

The clamp unit moves the mold unit 34 between open and closed positions by moving at least one of the first and second mold halves 36 and 38 towards the other of the first and second mold halves 36 and 38. Preferably, the first mold half 36 is positioned next to the second mold half 38 such that at least one of the first and second mold halves 36 and 38 is moved horizontally toward the other mold half to secure the mold unit 34 in the closed position. In the alternative, the first mold half 36 may be positioned directly beneath the second mold half 38 such that at least one of the first and second mold halves 36 and 38 is moved vertically toward the other mold half to secure the mold unit 34 in the closed position.

Referring to FIGS. 4A-4E, the first and second mold halves 36 and 38 are shown hingedly connected together such that the first or second mold half 36 or 38 is moved about the hinge pivot to move the mold unit 34 into a closed position. Although it is possible to position the mold halves 36 and 38 as such, it is preferred that the mold halves 36 and 38 are positioned so that the mold unit 34 may be closed by moving the mold halves 36 and 38 toward each other in a vertical or horizontal fashion, as described above. Accordingly, it should be appreciated that the position of the first and second mold halves 36 and 38 shown in FIGS. 4A-4E is for illustrative and descriptive purposes only, and should not be seen as limiting the scope of the present disclosure.

Figure 4A:
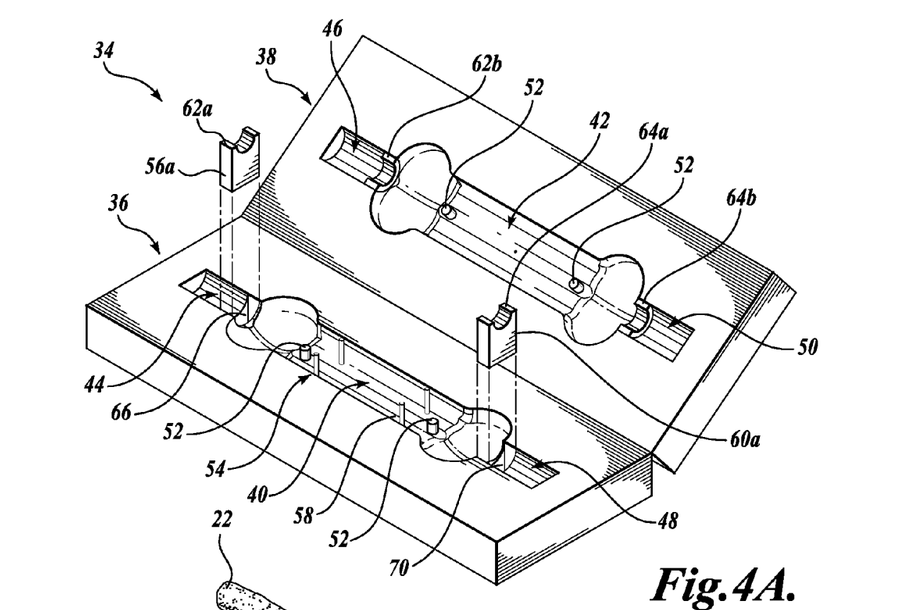
FIG. 4A is a partially exploded isometric view of a representative embodiment of a mold unit for manufacturing the chewable animal toy of FIG. 1.
Figure 4B:
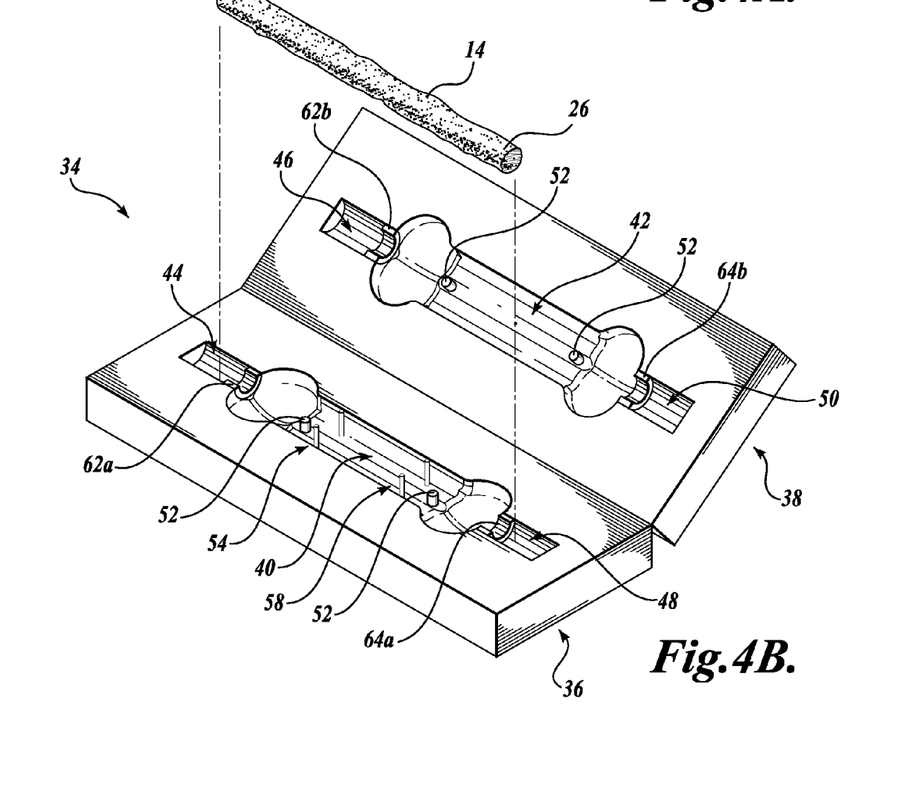
FIG. 4B is an isometric view of the mold unit of FIG. 4A shown receiving a portion of the chewable animal toy of FIG. 1.
Figure 4C:
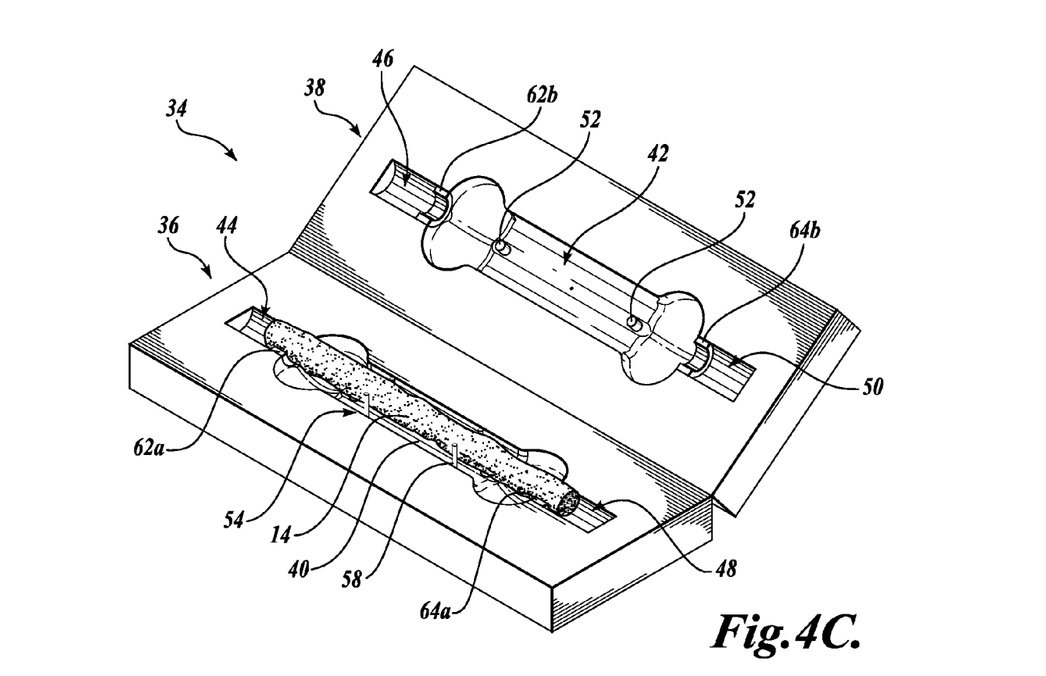
FIG. 4C is an isometric view of the mold unit of FIG. 4A shown with a portion of the chewable animal toy of FIG. 1 received therein.
Figure 4D:
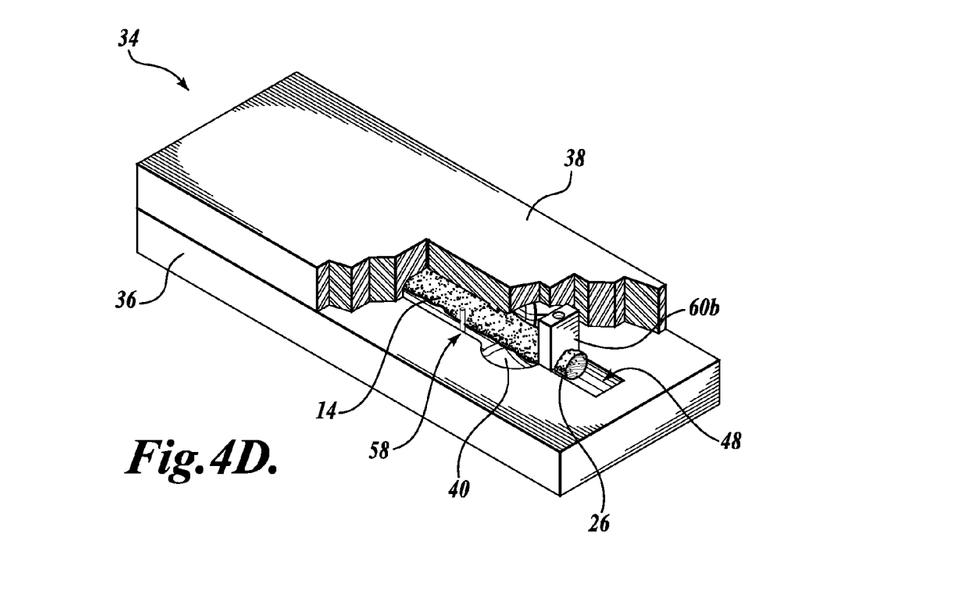
FIG. 4D is an isometric cutaway view of the mold unit of FIG. 4A, wherein the mold unit is shown in the closed position with a portion of the chewable animal toy of FIG. 1 received therein.

The mold unit 34 includes first and second pockets formed on each end of the outer shell mold for receiving the first and second protruding ends 22 and 26 of the edible core 14 when the mold unit 34 is in the closed position. The first pocket formed at one end of the mold unit 34 is defined by a first cavity 44 formed in the first mold half 36 adjacent to the first mold cavity 40 and a second cavity 46 formed in the second mold half 38 adjacent to the second mold cavity 42. Similarly, the second pocket formed at the opposite end of the outer shell mold is defined by a first cavity 48 formed in the first mold half 36 adjacent to the first mold cavity 40 and a second cavity 50 formed in the second mold half 38 adjacent to the second mold cavity 42. The first and second pockets provide an area for isolating the first and second protruding ends 22 and 26 of the edible core 14 from the injected material.

To aid in positioning the edible core 14 within the first and second mold cavities 40 and 42, a first set of retaining pins 52 are formed within the first and second mold cavities 40 and 42 and extend from the center of the mold cavities 40 and 42. The first set of retaining pins 52 retain the edible core 14 within the mold unit 34 such that the edible core 14 is substantially centered between the first and second mold cavities 40 and 42 when the mold unit 34 is closed. A second and third set of retaining pins 54 and 58 are formed within the first mold cavity 40 to secure the edible core 14 in its centered position within the first mold half 36 as the mold unit 34 is being moved into the closed position.

The second set of retaining pins 54 are positioned near one end of the mold cavity 40 and spaced from each other for receiving one end of the edible core 14 therebetween. The third set of retaining pins 58 are positioned near the other end of the mold cavity 40 and spaced from each other for receiving the other end of the edible core 14 therebetween. The second and third sets of retaining pins 54 and 58 secure the edible core 14 in a substantially centered position within the first mold cavity 40 as the first and second mold halves 36 and 38 are moved towards each other into the closed position.

Thus, if the mold halves 36 and 38 are positioned such that they must move horizontally toward each other, the edible core 14 does not fall out of the first mold cavity 40.

In addition to positioning the edible core 14 within the first and second mold cavities 40 and 42, the first set of retaining pins 52 form the plurality of through-holes 30 within the outer shell 12 during the molding process, and the second and third sets of retaining pins 54 and 58 form the plurality of through-holes 32 within the outer shell 12 during the molding process.

Figure 5A:
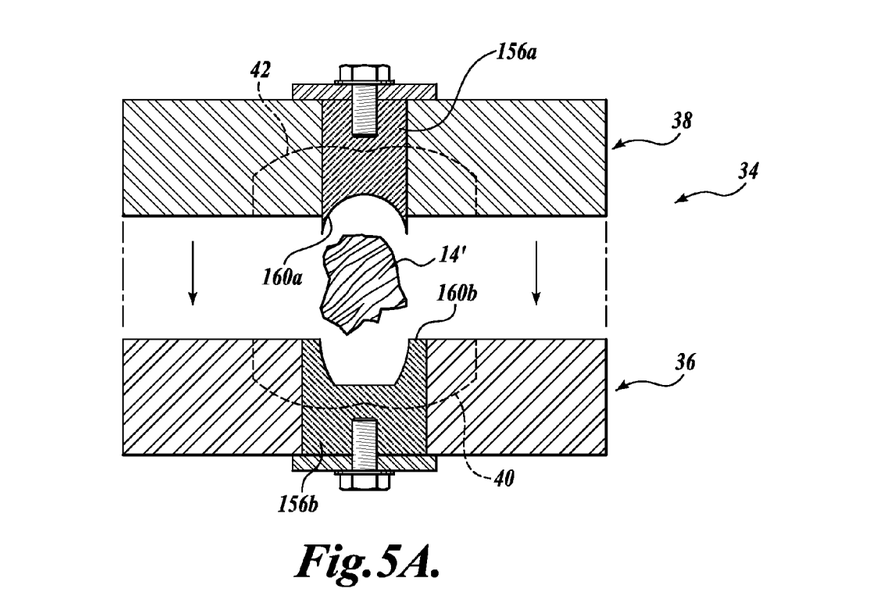
FIG. 5A is a cross-sectional view of an alternate embodiment of a mold unit for manufacturing the chewable animal toy of FIG. 1, wherein the mold unit is in the open position and receiving a portion of the chewable animal toy of FIG. 1.
Figure 5B:
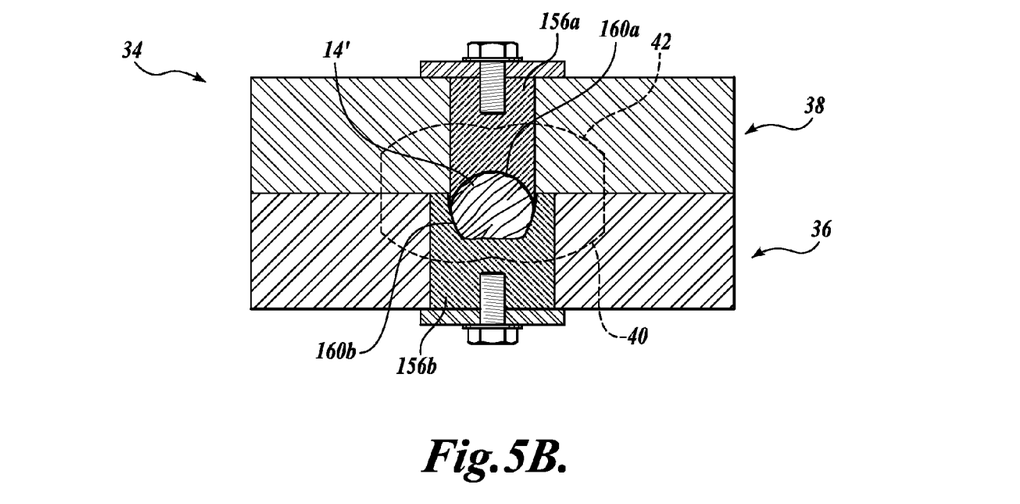
FIG. 5B is a cross-sectional view of the mold unit of FIG. 5A, wherein the mold unit is shown in the closed position with a portion of the chewable animal toy of FIG. 1 received therein.
Figure 5C:
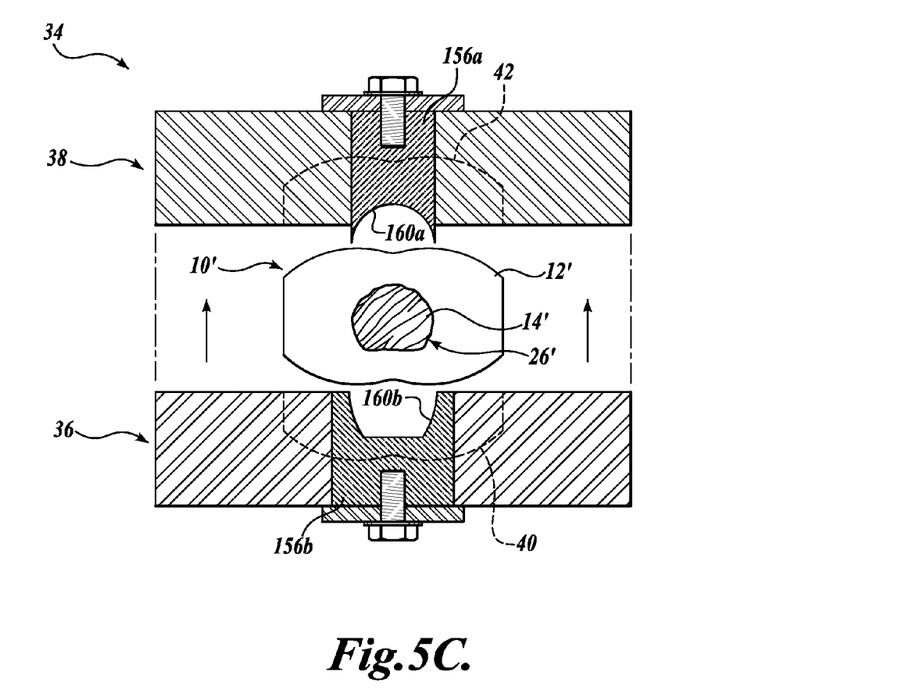
FIG. 5C is a cross-sectional view of the mold unit of FIG. 5A, wherein the mold unit is shown having formed the chewable animal toy of FIG. 1.
Figure 5D:
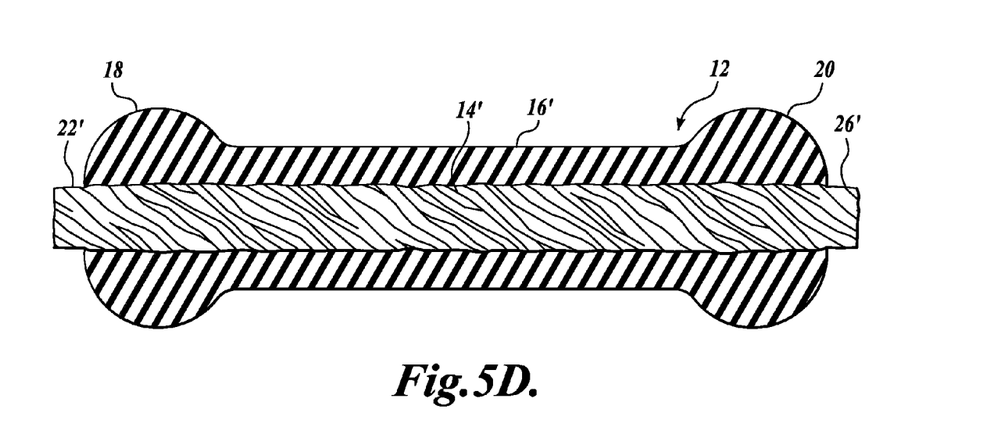
FIG. 5D is a top cross-sectional view of the chewable animal toy of FIG. 5C.

The mold unit 34 includes first and second shut-offs for preventing the first and second protruding ends 22 and 26 of the edible core 14 from being covered by the injected material during the molding process. The first shut-off is defined by a first shut-off body 56a having a first semi-circular closure element 62a formed in its upper end and a second shut-off body 56b (not shown) having a second semi-circular closure element 62b formed in its upper end. The first shut-off body 56a is received within a first opening 66 formed in the first cavity 44 such that the first semi-circular closure element 62a is positioned within the first cavity 44 adjacent to the first mold cavity 40. The second shut-off body 56b (not shown) is received within a second opening (not shown) formed in the second cavity 46 such that the second semi-circular closure element 62b is positioned within the second cavity 46 adjacent to the second mold cavity 42. The first and second shut-off bodies 56a and 56b are secured within the openings in any suitable manner, such as by bolting a bottom portion of the bodies 56a and 56b to an exterior portion of the mold unit 34. (See FIGS. 5A-5C.)

Figure 4E:
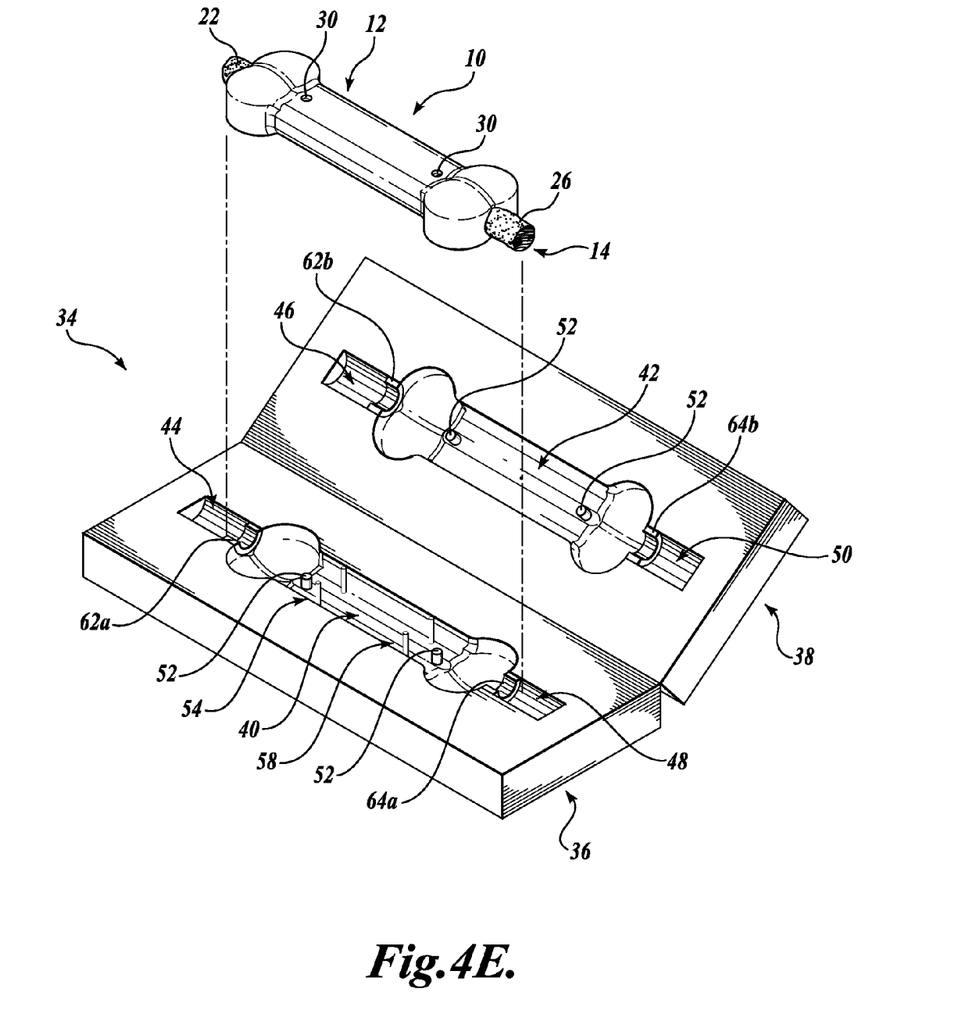
FIG. 4E is an isometric view of the mold unit of FIG. 4A, wherein the mold unit is shown having formed the chewable animal toy of FIG. 1.

The first and second closure elements 62a and 62b are adapted to surround and compress the first protruding end 22 of the edible core 14 when the first and second halves 36 and 38 of the mold unit 34 are clamped together. By surrounding the edible core 14 within the first and second closure elements 62a and 62b, the first protruding end 22 of the edible core 14 is effectively "sealed" or "shut" off to prevent injected material from passing into the first pocket and covering the first protruding end 22. As such, the first protruding end 22 remains exposed in the finished, molded chewable toy 10, as shown in FIG. 4E. Moreover, by compressing the uneven edible core 14, the first shut-off stops the injected material in a precise location and prevent undesired edge flash.

The second shut-off is similarly defined by first and second shut-off bodies 60a and 60b (not shown) having first and second semi-circular closure elements 64a and 64b formed in their upper ends. The first shut-off body 60a is received within a first opening 70 formed in the first cavity 48 such that the first semi-circular closure element 64a is positioned within the first cavity 48 adjacent to the first mold cavity 40. The second shut-off body 60b is received within a second opening (not shown) formed in the second cavity 50 such that the second semi-circular closure element 64b is positioned within the second cavity 50 adjacent to the second mold cavity 42. Similar to the first shut-off, the first and second closure elements 64a and 64b of the second shut-off are adapted to surround and compress the second protruding end 26 of the edible core 14 to prevent the injected material from passing into the second pocket and covering the second protruding end 26. It will be appreciated that the mold unit 34 will further include one or more ports (not shown) for receiving molten plastic into the mold unit 34.

Referring to FIGS. 5A-5D, an alternate embodiment of a shut-off for use with the mold unit 34 is depicted. The shut-off is defined by a first shut-off body 156a having a crescent-shaped closure element 160a formed therein and a second shut-off body 156b having a crescent-receiving closure element 160b formed therein. The crescent-shaped closure element 160a engages the crescent-receiving closure element 160b when the first and second halves 36 and 38 of the mold unit 34 are clamped together. The crescent-shaped closure element 160a is smaller in width than the crescent-receiving closure element 160b such that the crescent-shaped closure element 160a is at least partially receivable within the crescent-receiving closure element 160b. As such, when the edible core 14' is positioned between the closure elements 160a and 160b, the crescent-shaped closure element 160a will compress the edible core 14' within the crescent-receiving closure element 160b and prevent any injected material from covering the first or second protruding end 22' or 26' of the edible core 14'.

The chewable animal toy 10 may be given to animals such as dogs to occupy the dog, as well as to provide health benefits to the dog. Generally, the dog will become immediately engaged with the chewable animal toy 10 after receiving its from its owner because the dog can smell and taste the first and second protruding ends 22 and 26 of the edible core 14. After chewing off the first and second protruding ends 22 and 26, the dog will likely remain engaged with the chewable toy 10 for several hours as it continues to chew on the outer shell 12 to expose the edible core 14. The plurality of through holes 30 and 32 formed in the outer shell 12, as well as the exposed, first and second protruding ends 22 and 26 of the edible core 14, allows the dog to smell and partially taste the edible core 14 disposed within the outer shell 12. The smell keeps the dog engaged and motivates the dog to remove portions of the outer shell 12. As the dog chews on the outer shell 12, the dog removes pieces of the outer shell 12 to further expose the edible core 14 for consumption. After the outer shell 12 has been completely removed from the edible core 14, the dog may continue playing and chewing on the remaining portions of the outer shell 12, as it would with a standard plastic chew toy.

The chewable animal toy 10 may be designed for a specific animal or a specific breed of animal to provide the appropriate level of difficulty for the animal when removing the outer shell 12. In this manner, the animal does not become bored or disengaged easily. For instance, a chewable animal toy 10 designed for a large, strong dog, such as a pit bull, may include a harder or more durable outer shell 12 that is more difficult to remove, whereas a chewable animal toy 10 for a smaller dog, such as a Chihuahua or a Pomeranian, may include an outer shell 12 that is easier to remove. Similarly, the edible core 14 of a chewable toy 10 for larger dogs may be an edible substance that is more difficult to consume, such as rawhide, wherein the edible core 14 for a chewable toy 10 designed for a smaller dog may be a substance that is easier to consumer, such as compressed food. In this manner, the chewable animal toy 10 provides the appropriate level of entertainment for a variety of animals.

While illustrative embodiments have been illustrated and described, it will be appreciated that various changes can be made therein without departing from the spirit and scope of the present disclosure.

The embodiments of the present disclosure in which an exclusive property or privilege is claimed are defined as follows:

1. A mold unit for making a chewable animal toy, the chewable animal toy having an edible core with an uneven exterior surface and a plastic tearable outer shell molded around the edible core such that a portion of the edible core protrudes from the outer shell, the mold unit comprising:
    (a) a first mold half having a first mold cavity;
    (b) a second mold half having a second mold cavity, wherein the second mold half is engageable with the first mold half such that the first and second mold cavities cooperatively define an outer shell mold cavity; and (c) a first pocket defined between the first and second mold halves that is adapted to receive a first protruding portion of the edible core; and (d) a first shut off defined within the first pocket, the first shut off adapted to surround and compress the first protruding portion of the edible core such that the first protruding portion is substantially isolated from the outer shell mold cavity, wherein the first shut off is defined by first and second closure elements, the first closure element smaller in width than the second closure element such that the first closure element is at least partially receivable within the second closure element, wherein the first closure element compresses the first protruding portion of the edible core within the second closure element when the first mold half engages the second mold half.

2. The mold assembly of 1, further comprising a second pocket defined between the first and second mold halves that is adapted to receive a second protruding portion of the edible core.

3. The mold assembly of claim 2, further comprising a second shut off defined within the second pocket and adapted to surround and compress the second protruding portion of the edible core such that the second protruding portion is substantially isolated from the outer shell mold.

4. A method for making a chewable animal toy, the chewable animal toy having an edible core with an uneven exterior surface and a plastic tearable outer shell molded around the edible core such that a portion of the edible core protrudes from the outer shell, the method comprising:

(a) providing a mold unit, comprising:
  (i) a first mold half with a first mold cavity and a second mold half with a second mold cavity;
  (ii) a first pocket defined between the first and second mold halves that is adapted to receive a first protruding portion of the edible core;
  (iii) a first shut off defined within the first pocket, the first shut off adapted to surround and compress the first protruding portion of the edible core such that the first protruding portion is substantially isolated from the outer shell mold cavity, wherein the first shut off is defined by a first and second closure elements, the first closure element smaller in width than the second closure element such that the first closure element is at least partially receivable within the second closure element;

(b) positioning the edible core within the first mold cavity;

(c) isolating a first protruding portion of the edible core from the first mold cavity by positioning a first protruding portion of the edible core within the first pocket;

(d) engaging the first mold half with the second mold half such that the first and second mold cavities cooperatively define an outer shell mold cavity around a majority of the edible core and such that the first closure element compresses the first protruding portion of the edible core within the second closure element when the first mold half engages the second mold half;

(e) injecting material into the outer shell mold cavity to form the outer shell around the edible core such that the protruding portion of the edible core remains exposed.

5. The method of claim 4, wherein the first closure element is a crescent-shaped closure element and the second closure element is a crescent-receiving closure element.

6. The method of claim 4, wherein the mold unit further comprises a second pocket defined between the first and second mold halves that is adapted to receive a second protruding portion of the edible core.

7. The method of claim 6, wherein the mold unit further comprises a second shut off defined within the second pocket and adapted to surround and compress the second protruding portion of the edible core such that the second protruding portion is substantially isolated from the outer shell mold.

8. The method of claim 7, wherein the second shut off is defined by a third closure element and a fourth closure element, the third closure element being smaller in width than the fourth closure element such that the third closure element is at least partially receivable within the fourth closure element.

9. The method of claim 8, further comprising engaging the first mold half with the second mold half such that the first and second mold cavities cooperatively define an outer shell mold cavity around a majority of the edible core and such that the third closure element compresses the second protruding portion of the edible core within the fourth closure element when the first mold half engages the second mold half.

10. The method of claim 9, wherein the third closure element is a crescent-shaped closure element and the fourth closure element is a crescent-receiving closure element.

11. The mold assembly of claim 3, wherein the first closure element is a crescent-shaped closure element and the second closure element is a crescent-receiving closure element.

12. The mold assembly of claim 3, wherein the second shut off is defined by a third closure element and a fourth closure element, the third closure element being smaller in width than the fourth closure element such that the third closure element is at least partially receivable within the fourth closure element, wherein the third closure element compresses the second protruding portion of the edible core within the fourth closure element when the first mold half engages the second mold half.

13. The mold assembly of claim 12, wherein the third closure element is a crescent-shaped closure element and the fourth closure element is a crescent-receiving closure element.

14. A mold unit for making a device having a core with an uneven exterior surface and a plastic outer shell molded around the core such that a portion of the core protrudes from the outer shell, the mold unit comprising:

(a) a first mold half having a first mold cavity;

(b) a second mold half having a second mold cavity, wherein the second mold half is engageable with the first mold half such that the first and second mold cavities cooperatively define an outer shell mold cavity; and (c) a first pocket defined between the first and second mold halves that is adapted to receive a first protruding portion of the edible core; and (d) a first shut off defined within the first pocket, the first shut off adapted to surround and compress the first protruding portion of the core such that the first protruding portion is substantially isolated from the outer shell mold cavity, wherein the first shut off is defined by first and second closure elements, the first closure element smaller in width than the second closure element such that the first closure element is at least partially receivable within the second closure element, wherein the first closure element compresses the first protruding portion of the core within the second closure element when the first mold half engages the second mold half.

* * * * *

UNITED STATES PATENT AND TRADEMARK OFFICE
CERTIFICATE OF CORRECTION

PATENT NO. : 8,192,776 B2
APPLICATION NO. : 12/977058
DATED : June 5, 2012
INVENTOR(S) : B. R. Vardy et al.

Page 1 of 1

It is certified that error appears in the above-identified patent and that said Letters Patent is hereby corrected as shown below:

In the Claims:

| COLUMN | LINE | |
|---|---|---|
| 7 | 44 | "defined by a first and second" should read --defined by |
| (Claim 4, | line 17) | first and second-- |

Signed and Sealed this
Thirtieth Day of April, 2013

Teresa Stanek Rea
*Acting Director of the United States Patent and Trademark Office*